Feb. 19, 1935.  J. H. CLARK ET AL  1,991,658
METHOD OF MEASURING BOTTOM HOLE PRESSURES
Filed July 5, 1932  2 Sheets-Sheet 1
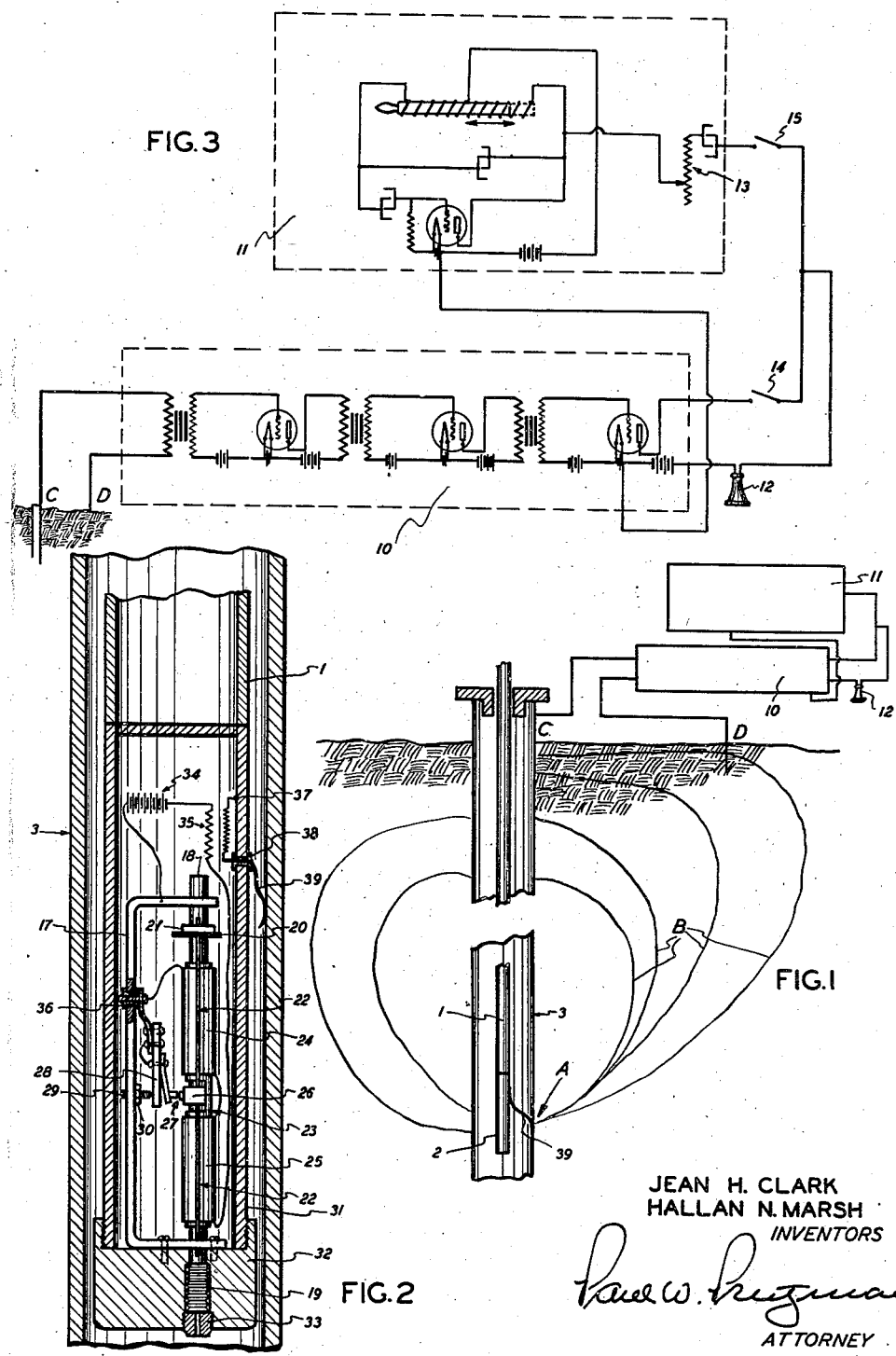
JEAN H. CLARK
HALLAN N. MARSH
INVENTORS
ATTORNEY Patented Feb. 19, 1935

1,991,658

UNITED STATES PATENT OFFICE 1,991,658

METHOD OF MEASURING BOTTOM HOLE PRESSURES

Jean H. Clark and Hallan N. Marsh, Huntington Park, Calif.

Application July 5, 1932, Serial No. 620,893

3 Claims. (Cl. 177—351)

The primary object of our invention is to provide a method of measuring the pressure existing at the bottom of or at any preferred depth in an oil well or other bore hole, and in particular for measuring the effect on pressure produced by pumping, by variations in pumping speed and length of stroke, and by intermittent pumping.

A further object of our invention is to provide a device for effectuating the said method of which the below-ground portion is small and cheap and can thus be placed and left on the end of a string of pump tubing without interfering with the pumping of the well or movements of the tubing; in which the more costly above-ground equipment is readily portable and may be taken from well to well, and in which the pressure indicated is conveyed from the bottom of the well to the surface without the aid of wires, fluid tubes or any means of communication other than the well casing and the surrounding earth.

Our invention of method lies in (a) setting up and maintaining a mechanical vibration in a device adapted to be placed at a desired level in the well (b) causing the rapidity of vibration to vary in response to variations in the pressure exerted by a fluid surrounding the device within the well (c) utilizing the vibration to make and break an electrical circuit adapted to set up an alternating or interrupted current flow through the earth surrounding the well (d) intercepting a minute portion of this current flow at two spaced points on the earth's surface adjacent the well head (e) amplifying this minute current, and (f) ascertaining by any suitable means (as by matching the note produced in a telephone) the rapidity of interruption of the current flow. The instrument producing the initial vibration having a known relation between vibration rate and imposed pressure (this relation being readily established by calibration), a mere observation at the well head of the momentary vibration rate suffices to give a clear and accurate indication of the momentary pressure imposed on the vibrating instrument, i. e., of the pressure existing in the well at the level of the instrument.

The invention, however, is broader than this series of steps would indicate, lying essentially in producing an electrical current modulated at a variable frequency under such conditions that the frequency will vary in known relation to variations in pressure, and in transmitting this current, directly or indirectly, to the earth's surface in such manner that it may be converted into an audible tone, the pitch of which may be matched or otherwise accurately determined. These broad steps may be effected in a variety of ways, which will be referred to following the description of our preferred method and apparatus.

The attached drawings and the following description refer to a preferred apparatus or device for practicing the method as specifically described above. In these drawings Fig. 1 is a diagram illustrating a complete vibrating and tone-reading assembly;

Fig. 2 shows, partly in elevation and partly in section, the detail of a suitable pressure-responsive vibrating device to be placed at the bottom of the tubing string, and Fig. 3 shows in convention a suitable amplifying and vibration-reading device to be used on the surface.

Figure 4:
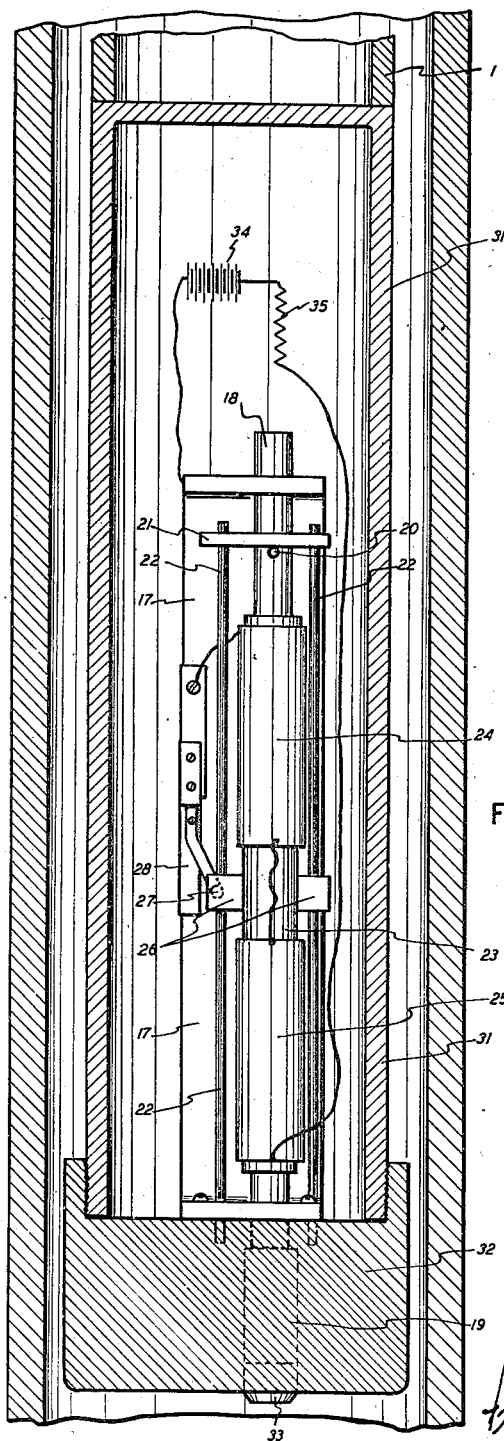
Fig. 4 is an enlarged view of the device shown in Fig. 2 taken at a right angle to that figure and looking to the left from the right hand side of the figure.

Referring to Fig. 1, 1 is the usual well tubing, 2 is the vibrating device or "submerged unit", fixed to the lower end of the tubing and preferably immediately below the pump. This unit is grounded to the casing at A and through the tubing to the casing at some higher point, as at the well head or at any point at which casing and tubing come into contact. A current flow through the earth is thus set up as indicated by the lines b. This current is partly intercepted by the connections C and D, to the casing and to a spaced ground respectively, and amplified by a vacuum tube amplifier 10 to produce an audible tone in the telephone receiver 12. This tone is matched by means of the vacuum tube variable frequency oscillator 11, and both the vibrator 2 and the oscillator 11 being calibrated to known pressures, the momentary pressure on the vibrator unit may be read directly from the oscillator dial, as will be further described.

Referring to Fig. 2, 2 is a fluid-tight case surrounding the vibrator assembly and closed by a heavy cap 32. This cap is provided with a perforated plug 33, the perforation communicating with the interior of a bellows 19. The upper end of the bellows bears against the lower end of a rigid iron rod 18 which is vertically supported in a frame 17, of iron or other magnetic material, the upper end of the rod sliding freely through the frame.

Near the upper end of the rod a yoke 21, fixed in position by the pin 20, supports the upper ends of two steel wires 22 the lower ends of these wires being fixed in the frame 17. An upward movement of rod 18 occasioned by an increase in pressure within bellows 19 thus increases the tension on these wires.

The rod 18 is provided with an insulating tube 23 on which are wound two magnetizing coils 24 and 25. The wires support an armature 26 having a make and break contact 27 supported on an insulating bar 28 through which the spacing of the contacts may be varied by means of an adjusting screw 29 and locknut 30. The bar is insulated from the frame by means of a bushing 36.

A battery 34 is connected through a transformer 35 and the coils 24 and 25 to one of the contact points 27, the opposite point being connected through the wires and frame to the opposite battery terminal. The points are so placed that current flowing through them and the coils draws the armature toward the rod and breaks the circuit, which is again closed by the tension of the wires carrying the armature. The device thus functions as a vibrator or buzzer in which the vibration rate increases with the tension on the wires and this tension, in turn, increases with the pressure within the bellows. There is thus a definite relation between vibration rate and pressure which may be calibrated in any given instrument by applying known pressures to the bellows, this rate being substantially independent of the amount of current supplied by the battery so long as the latter has sufficient power to actuate the armature.

The transformer 35 is a step-down transformer introduced for the purpose of approximately matching the low electrical impedance of the earth path and the tone-producing circuit. The secondary winding of this transformer is connected at one end to the tubing as at 37 while the other terminal passes through an insulating bushing 38 to a flexible brush 39 by which it is grounded to the well casing.

Referring to Fig. 3, the amplifying circuit 10 is of well-known and conventional pattern and needs no detailed description. It should be designed for a very low impedance input in order to match the impedance of the earth path and connecting wires, which should be of low electrical resistance.

Referring to the same figure, the variable vacuum tube oscillator is designed to secure the required variation through the use of a magnetic path of variable magnetic reluctance, in order to render unnecessary the large number of adjustments which would be required if a variable capacity were employed. The rheostat indicated at 13 is used to vary the output of the oscillator.

A portion of the current in the well casing and the earth being intercepted and amplified as described, an audible tone is produced in telephone receiver 12, the pitch of this tone varying with the rapidity of vibration of armature 26. The variable oscillator is now adjusted until, when the oscillator switch 15 and the amplifier switch 14 are closed alternately, the two tones are perceived to be of approximately equal volume and pitch. When this adjustment is reached, both of the switches are closed at once and the oscillator tone is closely adjusted until the beats which are easily perceptible occur only at considerable intervals. The oscillator and tone-producing device having been previously calibrated by means of known pressures, the pressure at the bottom of the well may be determined directly from the setting of the oscillator dial.

The two circuits indicated at 10 and 11 are preferred as being particularly suited to the purpose, but several other circuits could be substituted for either of those shown, such circuits being well known to those skilled in the art.

The tone-producing device shown in Fig. 2 contemplates the placing and sealing of the batteries in the case and the starting of the vibrator prior to running in the pump and tubing. The current consumption of the vibrator is so extremely small that a set of batteries which may feasibly be placed in such a location will maintain the vibration during a period ample for even an extended set of tests. At the completion of the tests the device may be allowed to remain in the well until there is occasion to remove the pump for some other purpose.

The disclosed method may be applied to the determination of pressures at inaccessible locations by any means, electrical or acoustic, by which the tone may be transmitted. Under favorable conditions the original mechanical vibration may be transmitted to and through metal parts, such as the well casing, and thus become audible at the surface of the earth or the exterior of the vessel the pressure in which is to be measured.

The bottom hole element consists of any equipment suitable for generating electrical impulses, and varying the frequency of these impulses as a function of the pressure. This may consist merely of a battery and buzzer with a tuned reed and means for changing the effective length or spring tension upon this reed as the pressure changes. It may also consist of an oscillating vacuum tube circuit the frequency of which is varied by varying the electrical capacity or inductance under influence of external pressure. This may be done by varying the spacing between condenser plates under control of external pressure transmitted through a diphragm or sylphon, or varying the gap in the magnetic circuit of the inductance coil by a movement of the core or other member under the control of external pressure through the diaphragm or sylphon.

We claim as our invention:

1. Apparatus for determining pressure at depth in a well, comprising: a closed case; means within said case for producing electrical impulses of variable frequency; means for transforming said impulses into a tone audible at the surface of the earth; means responsive to fluid pressure exerted on said case for varying the frequency of said impulses and the pitch of said tone, and means for accurately measuring variations in said pitch.

2. Apparatus for determining pressure at depth in a well, comprising: a closed case; means within said case for producing electrical impulses of variable frequency; means for transmitting said impulses through the earth surrounding said well; means responsive to fluid pressure exerted on said case for varying the frequency of said impulses; means for intercepting said impulses at the surface of the earth; means for transforming said impulses into an audible tone having a pitch varying with said frequency, and means for accurately measuring variations in said pitch.

3. The method of determining pressure variations at depth in a well, which comprises: maintaining a solid body in rapid vibration in a closed case immersed to a desired depth in said well; varying the speed of vibration in response to variations in the pressure exerted on said case by the fluid in said well; breaking an electrical circuit by means of vibrations of said body to produce electrical impulses through a circuit comprising the well casing and the surrounding earth; intercepting a portion of each of said impulses at the surface of the earth, and measuring the momentary frequency of said impulses whereby a measure of the momentary pressure on said case is obtained.

JEAN H. CLARK.
HALLAN N. MARSH.